May 31, 1955  W. R. SWANSON  2,709,790
MEANS FOR MEASURING FORCE AND DISPLACEMENT
Filed Nov. 17, 1953
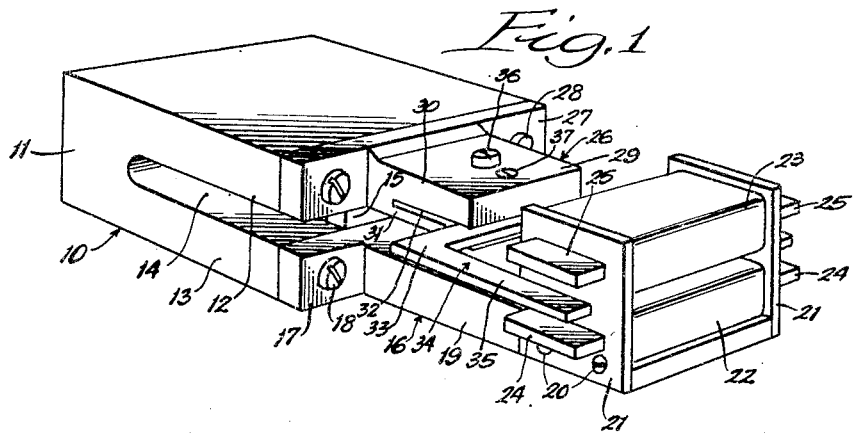
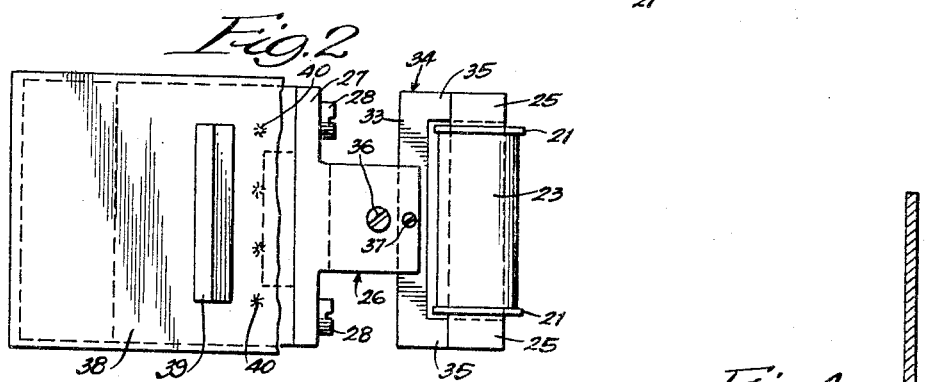
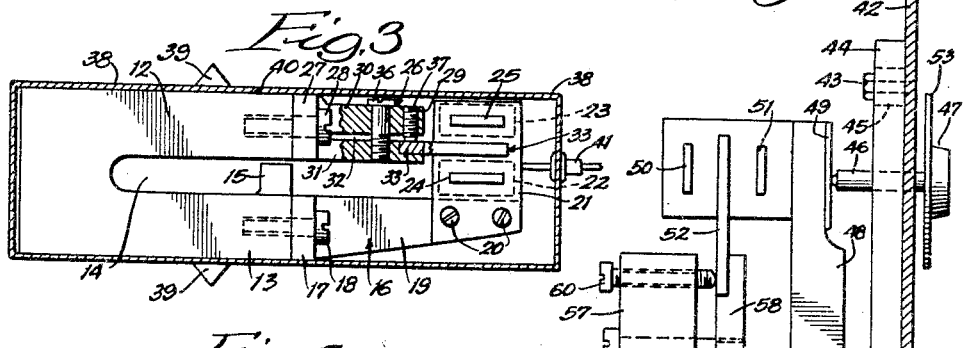
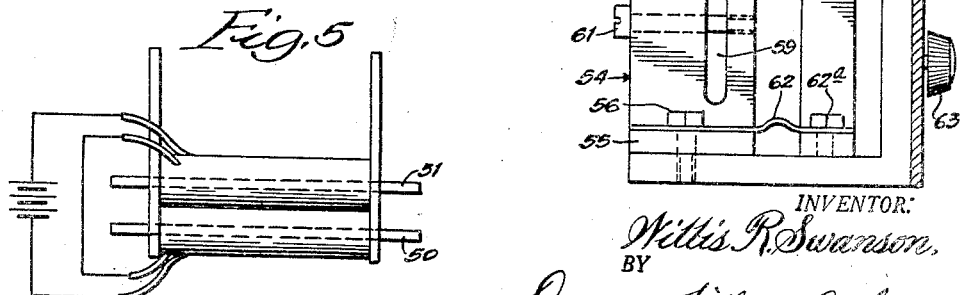
INVENTOR:
Willis R. Swanson,
BY
Dawson, Tilton & Graham
ATTORNEYS.

2,709,790

MEANS FOR MEASURING FORCE AND DISPLACEMENT

Willis R. Swanson, Wichita, Kans., assignor to Control Cells Corporation, Inc., Wichita, Kans., a corporation of Kansas Application November 17, 1953, Serial No. 392,563

9 Claims. (Cl. 336—30)

This invention relates to a means for measuring force and displacement and, more particularly, to an electronic force and displacement measuring system wherein the load sensing cells may be used interchangeably and are matched to interchangeable indicating instruments that are operative to provide linear response to the force or displacement reflected by the sensing devices.

There are a number of instances where it is desirable to measure accurately force, load, or any displacement. An example would be in the weighing of loads imposed upon members or carried or supported by apparatus of various sorts. Specifically, for example, it is desirable to ascertain quite accurately the loads carried by trucks that travel the public highways.

Electronic means for indicating such conditions might be desirably employed, for as is well known electronic apparatus can provide rapid response and therefore can be used to indicate quickly the conditions measured thereby. There has long existed a problem, however, in using electronic apparatus for measuring force or displacement in that such electronic equipment is affected seriously by environmental conditions and it is often difficult outside of the laboratory to provide surroundings that are necessary to attain repeatedly the degree of accuracy required in measuring force, load and displacement. Electronic equipment of this character is especially sensitive to changes in voltage, frequency and wave shape, as well as to temperature and humidity changes. Moreover, the non-linearity of electronic equipment that has been proposed for carrying out such measurements has seriously limited its range of applicability. For example, where magnetic systems are employed, it is customary to utilize only the center portion of the magnetic armature displacement curve where the response is relatively straight.

This choice or limitation introduces an objectionable decrease in the working range and sensitivity of the equipment. Therefore, one piece of equipment can be used to measure limited force or displacement, etc., and the equipment therefore must be designed and purchased with a particular measuring range in mind. If the range measurements vary from that initially selected, either the equipment must be altered substantially or new equipment must be purchased.

It is, accordingly, an object of this invention to provide a system for measuring force, load, displacement, and other similar conditions, wherein a single measuring apparatus may be used successfully to measure such conditions over large ranges without reducing the accuracy of response. Another object of the invention is to provide electronic means for measuring, indicating and controlling forces, etc., that has a high degree of sensitivity, accuracy and stability over a wide range of environmental conditions. Still another object is in the provision of electronic measuring means wherein a linear response system is provided, that is operable to measure condition changes over a wide range without impairment of sensitivity or accuracy.

A further object of the invention is in providing electronic measuring means of the character set out that is rugged and has a low cost and is inexpensive in both operation and installation, in that expensive, individual calibration is unnecessary. Yet a further object of the invention is in providing a sensing member and indicator therefor that may be initially adjusted as a factory step and calibrated to a predetermined standard whereby, upon installation of a system employing the sensing device and indicator, further adjustment is unnecessary. In this same regard, it is another object of the invention to provide condition sensing devices and indicators therefor that are all quickly and easily calibrated to a fixed standard, whereby the sensing devices are interchangeable as are the indicators, and any randomly selected sensing devices may be used without adjustment with any randomly selected indicators.

Further objects and advantages will appear as the specification proceeds.

Embodiments of the invention are illustrated in the accompanying drawings, in which:

Fig. 1 is a perspective view of a load cell or load sensing device, embodying the invention.

Fig. 2 is a top plan view with parts of the closure can being broken away.

Fig. 3 is a longitudinal, sectional view, taken through substantially the center of the cell.

Fig. 4 is a side view, in elevation, of the indicator balancing load cell.

Fig. 5 is a largely diagrammatic view, showing the electrical connections to the electric coils of a sensing device.

Reference will first be made to Fig. 1, wherein the device responsive to condition changes is shown in perspective. Fig. 1, then, shows a sensing device or load cell designated generally with the numeral 10. The sensing device 10 is formed from a block of steel that is preferably highly resistant to fatigue. The device is generally U-shaped and provides a base portion 11, having projecting forwardly therefrom an upper deflecting leg 12 and a lower deflecting leg 13. The legs 12 and 13 are separated by slot 14. Preferably, as is seen best in Fig. 3, a stop member 15 extends transversely across the slot 14 and may be secured to either the upper or lower deflecting leg. The stop member 15 provides a positive stop that limits the deflection of the legs 12 and 13. Any suitable means may be used to secure the stop member 15 in position upon the leg 13 and, for example, a solder connection may be provided. The size of the U-shaped sensing member will vary somewhat depending upon the range of loads or force to be measured thereby, but irrespective of the load and size relationship, the configuration shown in the drawings will be employed. It has been found that with a cell of this U-shaped construction that can effectively respond to loads from 100 pounds to 10,000 pounds, the U-shaped cell can be easily supported within the palm of one's hand.

Rigidly connected to the forward end of the lower leg 13 is a coil support member 16 which is preferably formed of a non-magnetic material, such as brass. The support member 16 has a base portion 17, rigidly secured to the deflecting leg 13 by cap screws 18 extending into the leg along each side thereof. The forwardly projecting support portion 19 of the coil support member 16 has secured on each side thereof by means of the screws 20 a non-magnetic support 21. The members 21 may be formed of plastic, for example.

Supported between the spaced members 21 are the electric coils 22 and 23, which are formed in the conventional manner by winding a plurality of wire turns about the cores 24 and 25. Preferably, the specific mounting shown in Fig. 1 is used wherein the cores 24 and 25 extend through aligned slots provided in the support plates 21 and the coils 22 and 23 between the support plates prevent lateral movement relative thereto.

An armature support member 26 is equipped with a base 27, rigidly secured at the forward end of the upward deflecting leg 12 by means of the cap screws 28. Formed integrally with the base 27 is the forwardly projecting support portion 29 that is provided with a relatively thick upper leg 30 and a relatively thin lower leg 31. The legs 30 and 31 are spaced apart by slot 32. As may be seen best in Fig. 3, the lower leg 31 has a cut-away portion adjacent the forward upper end thereof that is adapted to receive the transverse base portion 33 of the armature 34. Preferably, the armature base 33 is rigidly secured to the lower support leg 31 by means of welding or soldering the two members together. The armature support member 26 should be formed from a non-magnetic material, which may be, for example, bronze. It is clear from the drawings that the armature 34 is generally U-shaped and is provided with a pair of upwardly extending arms 35 that are received between the cores 24 and 25 of the electric coils. As is noted, the cores 24 and 25 are spaced apart by a considerable distance and this permits a relatively large range of movement of the armature 34 between the cores. Preferably, the cores 24 and 25 and the armature 34 have a characteristic of low magnetic memory, that is to say, they are preferably formed from a soft pure iron.

It is desirable to provide an accurate and a ready means for adjusting the position of the armature 34 relative to the cores 24 and 25, so that a zero adjustment can be quickly achieved and any differences in the structures due to manufacturing tolerances quickly compensated for. This is accomplished by providing the adjusting screws 36 and 37 which operate in conjunction with the split legs 31 and 30 of the armature support member. Actually, the adjusting screw 37 serves a dual purpose, in that it is utilized to hold the armature 34 to the lower leg 31 during the soldering operation, wherein these two members are secured together. As may be seen best in Fig. 3, the adjusting screw 37 is threadedly received within a threaded bore provided through the upper support leg 30, while the screw 36 passes freely through a slightly enlarged bore through the upper support leg 30, but is threadedly received within a threaded bore provided in the lower support leg 31. Thus, to adjust the armature, the screw 37 may be released and the screw 36 tightened to raise the armature, or the screw 36 released and the screw 37 tightened down to lower the armature. After adjustment, by tightening the particular screw that was not used during the adjustment, a lock arrangement is provided.

For most accurate operation, the coils 22 and 23 should be wound and connected, so that the north and south poles of each are at the same ends. The representation in Fig. 3 is intended to show this arrangement.

After the sensing device 10 has been assembled and adjusted, as has been hereinbefore set out, the entire unit is enclosed within a hermetically sealed closure can 38. The can 38 has rigidly secured thereto a pair of knife edge members 39 that are adapted to have a load or force impressed thereupon. The members 39 may be rigidly secured to the can 38 in any suitable manner, such as by welding or soldering, etc. The particular knife edge members 39 are provided so that minimum mechanical hysteresis results when the load or force is supported thereon along the apex of the members 39. It will be appreciated that when a load is impressed across the members 39 that the deflecting legs 12 and 13 will be moved together and therefore the sensitivity of the device may be adjusted by relating the knife edge members 39 to the length of the deflecting legs 12 and 13. For example, a greater mechanical advantage is realized when the members 39 are moved toward the forward end of the legs 12 and 13, and sensitivity is then increased. After the sensing member 10 is positioned as desired within the can 38, the can and device are secured together as by the spot welds 40, shown best in Fig. 2 and indicated also in Fig. 3. It will be appreciated that provision must be made for the entrance of electric leads into the interior of the can 38 and a sealing member 41 is provided for this purpose.

The sensing members thus far described may be referred to as active sensing devices and any number of these may be positioned as required to sense load, force or linear movement, etc., of any particular thing it is desired to measure. In the circuit arrangement that will be described subsequently, an indicator load sensing device is also provided and is substantially identical to the one shown in Figs. 1 through 3, except that, if desired, it may be slightly shorter. The indicator load cell is used to provide a balance with the active load cell having the force, etc., imposed thereon. The indicator load cell is shown in Fig. 4 and will now be described.

An indicator box will be provided, and this box will enclose the indicator load cell and the majority of the circuit for the system that will be hereinafter described. The box is provided with a front panel 42, having rigidly secured thereto by means of bolts 43 an L-shaped support bracket 44. The member 44 is provided with an enlarged slot 45 therethrough that receives the bolt 43 and permits adjustment of the member 44 relative to the bolt. This adjustment is similar to the sensitivity adjustment described before with relation to the relative positioning of the knife edge members 39 relative to the deflecting legs 12 and 13. More specifically, a pin or stud 46 extends through the front panel 42 and through the support bracket 44 and is equipped at its outer end with a knob 47, adapted to be manually turned, and at its inner end abuts the coil support member 48 that is provided with an insert plate 49 formed of a relatively hard material and that is in actual engagement with the pin 46. A screw arrangement is provided, so that as the knob 47 is rotated the pin 46 moves either inwardly or outwardly depending upon the direction of rotation and pivots the coil support member 48, whereby the coil cores 50 and 51 are adjusted relative to the armature 52. The knob 47 may be equipped with an enlarged indicator scale 53, having suitable indicia thereon and that will cooperate with a witness line or arrow provided on the face of the panel 42.

The armature support member 54 is equipped at its base with a flange 55 that is rigidly secured to the L-shaped bracket 44 by means of the cap screws 56. The member 54 has an enlarged support leg 57 and a relatively narrow support leg 58, spaced apart by slot 59. Adjusting screws 60 and 61 are provided, so that the position of the armature 52 relative to the cores 50 and 51 of the coils may be accurately adjusted.

Preferably, the coil support member 48 is rigidly secured at its base end to a leaf spring 62 by means of a bolt 62a that is rigidly connected at its opposite end to the flange 55 by cap screw 56. The leaf spring 62 is operative to bias or spring load the member 48 supporting the coils, so that the core 50 tends to approach the armature 52. Thus, by releasing the pin 46, the core 50 tends to move toward the armature 52, while upon threading the pin 46 inwardly the core 51 is brought closer to the armature 52. A switch knob 63 is also carried on the panel 42 for manual adjusting of a pair of switches that will be described later when the circuit is discussed.

*Operation*

In the operation of the system thus far described, one or more active sensing devices are mounted so that a force or load, etc. is imposed thereon, and the magnitude of the load will be reflected by the amount of deflection of the legs 12 and 13 of the member or members having the force imposed thereon. The sensing devices will first be connected appropriately in a suitable circuit and the sensitivity and zeroing adjustments that have been described will be made. Therefore, the system will be ready for immediate use, and the force imposed across the load cell that has been switched into the indicating circuit can be immediately read.

It perhaps should be mentioned again that the active load cells and also the indicator load cell will have their armatures adjusted as a part of a factory operation, so that the cells will be zero adjusted to a predetermined standard. Similarly, the sensitivity of the active load cells and sensitivity of the indicator load cells will also be adjusted as a part of the factory assembly to some predetermined standard. Thus, each of the load cells will have substantially identical sensitivity and zero characteristics, and can be used interchangeably. Thus, any number of load cells in a particular installation may be switched into the indicating circuit and the response indicated thereby will be an accurate representation of the load or force imposed upon the load cells. Similarly, any active load cells that have been calibrated to the predetermined standard can be used with any indicator that has been calibrated to the standard. This is particularly desirable in truck weighing applications, wherein an active load cell will be positioned adjacent each of the trailer spring brackets and adjacent the fifth wheel mounting carried by the tractor. In such an installation, the indicator would most generally be carried by the tractor. Therefore, any tractor could be connected to any trailer and the load indications would always be accurate representations of the true load, and further a check indicator could be connected to any tractor-trailer system, so that spot checks could readily be made.

When the system is ready for use, the knob 63 is switched from the off position to any of the other switch positions provided; this will be operative to place one of the active load cells in the circuit. The force carried by the selected load cell will have caused a deflection of the legs 12 and 13, so that the zero position of the armature 34 of that load cell, relative to the cores of the coils, will have changed and a condition of unbalance will be present in the system. The operator then rotates the manual knob 47 to change the relative position between the indicator armature 52 and coil cores and the adjustment is continued until the needle of a meter or other indicating device is at the null or zero point (preferably a null balance system is used). When this adjustment has been made, the operator will know that the system is then in balance. The scale 53 carried by the knob 47 is preferably calibrated to read load or force directly and thereafter the position of the indicator 53 relative to a witness line is noted, and the operator can read directly the load or force imposed upon the active load cell that has been placed in the circuit. It should be understood that the indicator 53 may carry any suitable scale indicia and displacement, as well as force or load in pounds, may be read directly, depending upon the indicia provided. To switch another of the active load cells into the circuit, ganged switches controlled by the knob 63 are swung to a new position and the procedure set out above repeated for each cell in the system, assuming that the system is arranged to read the load on each cell individually.

While in the foregoing specification embodiments of the invention have been set out in considerable detail for purposes of illustration, it will be apparent to those skilled in the art that considerable change may be made in these details without departing from the spirit and principles of the invention.

I claim:

1. An assembly adapted to produce condition changes corresponding to the force imposed thereon, comprising an active sensing device having spaced-apart legs adapted to have a force imposed thereon, said legs being deflectible in response to a force imposed thereon to change the spacing therebetween, a sensing member having elements carried by each of said legs and being freely movable relative to each other, relative movement between said elements brought about by the deflection of said legs being operative to establish condition changes in said sensing member corresponding to the force imposed across said legs, and a closure can having bearing members rigidly secured thereto and enclosing said assembly, the relative position of the bearing members and deflecting legs being adapted to control the sensitivity of said active sensing device.

2. In a load-responsive device adapted to produce variations in an electric current corresponding to the magnitude of a force imposed thereon, a generally U-shaped deflection member having spaced apart legs integral at one end and extending therefrom in substantially parallel relation to provide a relatively small deflection gap therebetween, said legs being adapted to deflect linearly in response to a force imposed thereon to reduce the gap therebetween, electric means including spaced-apart core-equipped coils carried by one of said legs and an armature carried by the other of said legs, said armature being supported by adjustable means whereby the initial position of the armature relative to the coils and cores may be adjusted to provide a predetermined normal condition for said device, and a closure member enclosing said device, secured thereto and providing bearing members for imposing a load upon said legs.

3. A load-responsive member adapted for use in a load-indicating system, comprising a support equipped with a pair of cantilever deflection members extending laterally therefrom, said members being spaced apart to provide a relative small deflection gap therebetween, core-equipped electric coil means carried by one of said deflection members and an armature carried by the other of said deflection members, said armature being adjustably carried whereby its position relative to the core-equipped coils may be selectively changed to provide a zero balance condition for the coils, and a closure can equipped with bearing members enclosing said support, said closure can being secured at selected points to said device to orient the bearing members with respect to said deflection members.

4. In a device of the character described, a pair of deflection legs adapted to have a load applied thereacross, said legs being movable relative to each other in response to the application of a load thereto, electric sensing means for measuring relative movement between said legs and comprising inductance elements carried by one of said legs and an armature carried by the other of said legs, and means for adjusting said armature relative to said inductance elements for establishing the initial condition of said sensing means, said last mentioned means comprising an armature support member secured to one of said legs and being equipped with a bifurcated end portion forming spaced-apart legs, said armature being secured to one of said last mentioned legs, and means for establishing the position of that leg by adjustment thereof relative to the other of said spaced-apart legs.

5. The structure of claim 4 in which said device is enclosed in a closure can, said can being secured to one of said deflection legs at spaced-apart points and being equipped with bearing members for applying a load to said deflection legs.

6. The structure of claim 4 in which said spaced-apart legs are of different thickness, the one carrying said armature being relatively thin and the other relatively thick.

7. The device of claim 4 in which a spring member is provided and is secured to each of said deflection legs adjacent an end thereof, and in which a manually adjustable pin is arranged to bear against one of said legs for imposing a selectively variable force thereon to move that leg and change the spacing between said deflection legs.

8. In apparatus for measuring the magnitude of a force applied thereto, a generally U-shaped sensing device having spaced apart legs deflectable relative to each other in response to a force imposed thereon and in a predetermined relation to the magnitude thereof, sensing means carried by said legs and being operative to effect condition changes corresponding to the deflection of said legs and thereby representative of the magnitude of a force imposed upon said legs, a closure can enclosing said sensing device and sensing means and being equipped on opposite sides thereof with bearing members arranged to receive a force and impose the same upon said legs, said closure can being greater in length than said sensing device and sensing means whereby said can is shiftable longitudinally to selectively relate the position thereof to said legs and thereby control the sensitivity of said sensing device, and means for securing said can in a selected position thereof to said sensing device.

9. The apparatus of claim 8 in which said closure can is secured to said sensing device by a plurality of spot welds spaced apart transversely across one of said legs.

References Cited in the file of this patent

UNITED STATES PATENTS

| | | |
|---|---|---|
| 1,028,851 | Bard | June 11, 1912 |
| 1,640,464 | Mershon | Aug. 30, 1927 |
| 2,050,629 | Quereau | Aug. 11, 1936 |
| 2,237,928 | Cressy | Apr. 8, 1941 |
| 2,328,320 | Baruch et al. | Aug. 31, 1943 |
| 2,382,289 | Burt | Aug. 14, 1945 |
| 2,417,097 | Warshaw | Mar. 11, 1947 |
| 2,440,605 | Hathaway | Apr. 27, 1948 |
| 2,539,833 | Hathaway | Jan. 30, 1951 |
| 2,620,469 | Estes | Dec. 2, 1952 |
| 2,661,460 | Matthews | Dec. 1, 1953 |

FOREIGN PATENTS

| | | |
|---|---|---|
| 743,325 | Germany | Dec. 23, 1943 |